United States Patent
Tunali et al.

(10) Patent No.: US 10,055,666 B2
(45) Date of Patent: Aug. 21, 2018

(54) REAL-TIME, SEMI-AUTOMATIC METHOD FOR TARGET TRACKING WINDOW INITIALIZATION IN THERMAL IMAGERY

(71) Applicant: ASELSAN ELEKTRONIK SANAYI VE TICARET ANONIM ŞIRKETI, Ankara (TR)

(72) Inventors: Emre Tunali, Ankara (TR); Sinan Oz, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 15/308,100

(22) PCT Filed: May 8, 2014

(86) PCT No.: PCT/TR2014/000158
§ 371 (c)(1),
(2) Date: Nov. 1, 2016

(87) PCT Pub. No.: WO2015/171084
PCT Pub. Date: Nov. 12, 2015

(65) Prior Publication Data
US 2017/0053181 A1  Feb. 23, 2017

(51) Int. Cl.
*G06K 9/00* (2006.01)
*G06K 9/32* (2006.01)
(Continued)

(52) U.S. Cl.
CPC ......... *G06K 9/3233* (2013.01); *G06K 9/2081* (2013.01); *G06K 9/4642* (2013.01); *G06K 9/4671* (2013.01); *G06K 2209/21* (2013.01)

(58) Field of Classification Search
CPC .. G06K 9/2081; G06K 9/3233; G06K 9/4642; G06K 9/4671; G06K 2209/21
See application file for complete search history.

(56) References Cited

U.S. PATENT DOCUMENTS

| 8,787,658 B2 * | 7/2014 | Rother ..................... G06K 9/34 382/159 |
| 9,298,980 B1 * | 3/2016 | Yuan .................. G06K 9/00456 |

(Continued)

FOREIGN PATENT DOCUMENTS

| CN | 101329767 | 12/2008 |
| DE | 10066189 B4 | 9/2006 |
| WO | WO2013088199 A1 | 6/2013 |

OTHER PUBLICATIONS

Sezgin et al.,"Survey over image thresholding techniques and quantitative performance evaluation", Journal of Electronic Imaging 13(1), 146-165 (Jan. 2004).*

(Continued)

*Primary Examiner* — Mekonen Bekele
(74) *Attorney, Agent, or Firm* — Gokalp Bayramoglu (57) ABSTRACT

A real-time, semi-automatic method for discriminant track initialization in thermal imagery is very critical for tracking since it determines what to track for the tracker. Therefore, any insignificant or false information may result in redundant features or deceptive appearance that can cause premature track losses. To achieve long-term tracking, a real-time, semi-automatic track initialization methodology for IR images is proposed which takes a single image coordinate as input, then generates target bounding box for the most salient segment. The present invention is designed for real-time applications in which erroneous user input is unavoidable. Therefore, error compensation capability of present invention both introduces many practical advantageous together with performance boost. Low computational cost and requirement of only a point coordinate as input in the vicinity of the target make this approach preferable in real-time tracking applications.

14 Claims, 6 Drawing Sheets

(51) Int. Cl.
*G06K 9/46* (2006.01)
*G06K 9/20* (2006.01)

(56) References Cited

U.S. PATENT DOCUMENTS

| | | | | |
|---|---|---|---|---|
| 9,595,114 | B2* | 3/2017 | Tunali | G06K 9/4642 |
| 9,792,676 | B2* | 10/2017 | Nguyen | G06T 5/50 |
| 2008/0304740 | A1 | 12/2008 | Sun et al. | |
| 2011/0216965 | A1* | 9/2011 | Rother | G06K 9/62 |
| | | | | 382/159 |
| 2012/0288189 | A1 | 11/2012 | Hu et al. | |
| 2012/0294476 | A1 | 11/2012 | Wei et al. | |
| 2014/0063275 | A1* | 3/2014 | Krahenbuhl | H04N 19/117 |
| | | | | 348/208.4 |
| 2015/0055824 | A1* | 2/2015 | Hong | G06K 9/00624 |
| | | | | 382/103 |
| 2015/0324995 | A1* | 11/2015 | Yamamoto | G06T 7/0081 |
| | | | | 382/173 |
| 2016/0189343 | A1* | 6/2016 | Chen | G06K 9/46 |
| | | | | 382/195 |
| 2016/0239981 | A1* | 8/2016 | Tunali | G06K 9/4642 |
| 2016/0259990 | A1* | 9/2016 | Yamanaka | G06K 9/3233 |

OTHER PUBLICATIONS

Sun Jingle et a., "Specified target detection and tracking on complex Infrared, background" The 2nd International Conference on Computer Application and System Modeling (2012).*

Tie Liu et al., (hereafter Liu) "Learning to Detect a Salient Object", IEEE Transactions on Pattern Analysis and Machine Intelligence, vol. 33, No. 2, Feb. 2011.*

Nobuyoki Otsu,"A threshold selection method from gray-level histograms", IEEE Trans. Sys. Man., Cyber.9,1979(1), 62-66. doi:10.1109/TMSC.1979.4310076.

Y.Wei, F.Wen, W.Zhu and J.Sun, "Geodesic Saliency Using Background Priors", IEEE, ICCV,2012.

Sun Jingle. tang Linbo, Zhao Baojun, LiuQing: "Specified Target Detection and Tracking on Complex Infrared Background", The 2nd International Conference on Computer Application and System Modelling((2012), Jul. 31, 2012(Jul. 31, 2012), XP002734473, Paris DOI:10.2991/iccasm.2012.356 Retrieved from the Internet: URL:http://www.atlantis-press.com/publications/aisr/iccasm-12/ [retrieved on Jan. 14, 2015] Section III and IV.

Tie Liu et al: "Learning to Detect a Salient Object", IEEE Transactions on Pattern Analysis and Machine Intelligence, IEEE Computer Society, USA, vol. 33, No. 2, Feb. 1, 2011 (Feb. 1, 2011), pp. 353-367, XP011340188, ISSN:0162-8828, DOI:10.1109/TPAMI. 2010.70 Section 2, 2.1. 3, 3.1, 3.1.1, 3.1.2, 3.1.3.

Yichen Wei et al.:"Geodesic Saliency Using Background Priors", Oct. 7, 2012(Oct. 7, 2012), Computer Vision ECCV 2012, Springer Berlin Heidelberg, Berlin, Heidelberg, pp. 29-42, XP047018985, ISBN: 978-3-642-33711-6 Section 2, 2.1 and 3.

* cited by examiner

REAL-TIME, SEMI-AUTOMATIC METHOD FOR TARGET TRACKING WINDOW INITIALIZATION IN THERMAL IMAGERY

CROSS REFERENCE TO RELATED APPLICATIONS

This application is the national phase entry of International Application No. PCT/TR2014/000158, filed on May 8, 2014, the entire contents of which are incorporated herein by reference.

TECHNICAL FIELD

The present invention relates to a biologically inspired, semi-automatic track initialization method for real-time applications using IR imagery that takes an image coordinate as input, then generates target bounding box for the tracker as track window. The present invention is capable of compensating erroneous user input, generates exactly same target bounding box even if the click input scatters, and also designed to boost tracker performance by initializing tracker with more discriminative targets. By requesting nothing but a click input, the present invention becomes both semi-automatic and appropriate for real-time applications.

BACKGROUND

Target tracking is a classical problem, so diverse set of algorithms exist in the literature. However, most of the tracking algorithms assume predetermined target location and size for track initialization. Hence, in many applications, target size and location are required as input from human-users. Obviously, track initialization can drastically change tracker performance, since it determines for the tracker what to track, i.e. features, appearance, contours. Thus, any insignificant or false information may result in mislearning of target appearance.

Figure 9:
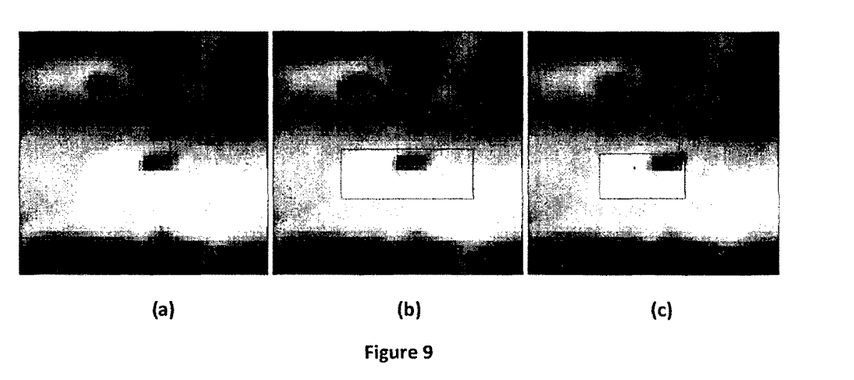
FIG. 9 shows the input image (a), initialization with whole target (b) and initialization via present invention (c) which results in better discriminability due to high resemblance between target and background.

Request for target bounding box for track initialization may be answered by the user if there is not any time constraint for target selection. However, for many real-time applications drawing bounding box around the target manually is inappropriate since target should be marked instantly. Therefore, in real time applications, erroneous input is usually provided by the user due to time restriction. Moreover, system delays are also unavoidable in such systems which also increase possibility of false track initialization. Indeed, erroneous user input results in suboptimal tracking performance and yields premature track losses. If long-term tracking performance is desired, this erroneous input should be compensated. Moreover, even in the case that user provides a perfect bounding box for object, depending on the appearance of the target; this initialization may not always be preferred. For example, if track window is given as in (b) of FIG. 9, it may result in redundant features or deceptive appearance depending on the type of tracker, due to high resemblance between target and background, and may not provide long-term tracking. Hence, in order to achieve longer tracks, the proposed method selects the most salient (distinctive) segment from background as target as illustrated in (c) of FIG. 9.

China patent document CN101329767 discloses an automatic inspection method of a significant object sequence based on studying videos. In the method of the invention, first static significant features then dynamic significant features are calculated and self-adaptively combined according to the space continuity of each image of frame and the time continuity of significant objects in neighboring images. Since this method generally takes several seconds to process an image, it is not appropriate for real-time applications.

United States patent document US2012288189, an application in the state of the art, discloses an image processing method which includes a segmentation step that segments an input image into a plurality of regions by using an automatic segmentation algorithm, and a computation step that calculates a saliency value of one region of the plurality of segmented regions by using a weighted sum of color differences between the one region and all other regions. Accordingly, it is possible to automatically analyze visual saliency regions in an image, and a result of analysis can be used in application areas including significant object detection, object recognition, adaptive image compression, content-aware image resizing, and image retrieval. However, change in image resolution result in change in processing time which may exceed real-time application limits.

United States patent document US2008304740, an application in the state of the art, discloses methods for detecting a salient object in an input image are described. For this, the salient object in an image may be defined using a set of local, regional, and global features including multi-scale contrast, center-surround histogram, and color spatial distribution. These features are optimally combined through conditional random field learning. The learned conditional random field is then used to locate the salient object in the image. The methods can also use image segmentation, where the salient object is separated from the image background. However, obviously it is not proper for the real time usage.

United States patent document US20120294476, an application in the state of the art, discloses methods for detecting a salient object in an input, image are described. To find the salient objects, a computing device determines saliency measures for locations in the image based on costs of composing the locations from parts of the image outside of those locations. In the beginning of the process, input image is segmented into parts then saliency measures are calculated based on appearance and spatial distances for locations defined by sliding windows. In conclusion, this system cannot be proper for the real time usage.

The PCT application document 8058-143 is also intended to achieve the same goal by using center-surround histogram differences and a suboptimal thresholding methodology together with the same saliency map generation. Although both methodologies use geodesic saliency as discrimination measure, the present invention uses completely different initial window selection mechanism together with an optimal thresholding methodology that yields superior track initialization performance with improved error compensation and time efficiency. Moreover, initial window correction step is introduced in the present invention which improves the robustness directly together with thermal core alignment step.

REFERENCES

[1] Nobuyoki Otsu, "A threshold selection method from gray-level histograms", IEEE Trans. Sys. Man., Cyber. 9, 1979(1), 62-66. doi:10.1109/TMSC.1979.4310076
[2] Y. Wei, F. Wen. W. Zhu and J. Sun, "Geodesic Saliency Using Background Priors", IEEE, ICCV, 2012.

SUMMARY OF THE INVENTION

Figure 10:
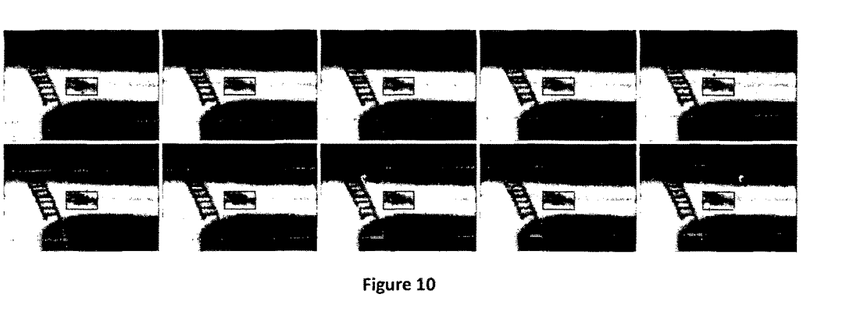
FIG. 10 shows the output, selected target bounding box, with scattered user inputs.

Objective of the present invention is to provide track initialization framework which takes a single image coordinate from the user and returns the most discriminant region bounding box in the neighborhood. The proposed framework includes two outstanding features which are also proven. Firstly, it is robust to user input error meaning that exactly same track initialization can be achieved even if the given coordinate scatters in a neighborhood in the vicinity of the target as illustrated in FIG. 10. Secondly, since track initialization is based on visual saliency, it results in more discriminative targets with respect to background and provides long-term tracking even in trackers that claim to deal with discrimination problem during tracking. Although, redetection is merit of tracker itself, this feature also boost redetection performance since better discriminative targets are in consideration. Another important prosperity of the present invention is its suitability of real-time systems due to its low computational cost.

Figure 1:
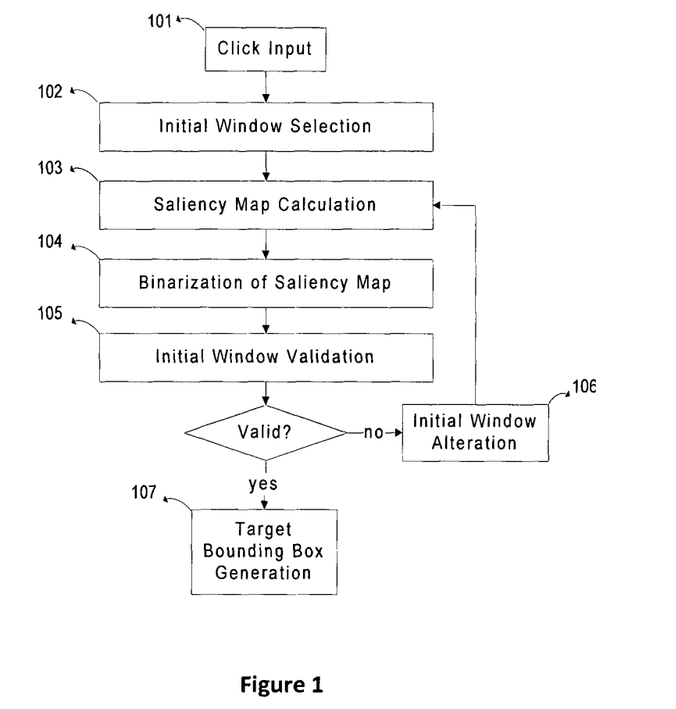
FIG. 1 shows the flowchart of the overall system.

The present invention goes through the following stages to achieve discriminant track initialization: First, initial window containing the actual target and its immediate background is selected (102); second visual saliency method by Y. Wei. et. al., "Geodesic saliency using background priors", 2012, ECCV, is exploited in the window and saliency map is obtained (103) and then it is binarized (104). After then, a validation procedure for initial window selection is utilized (105) by using heuristics on validity of saliency map; since the resulting saliency map and initial window selection is closely related. If the validation procedure defines window as invalid initial window alteration (106) is achieved. Finally, the connected component having maximum total saliency with minimum distance to the click input (101) is selected as target (107). All the concepts that are mentioned here will be explained in detail in the following section.

BRIEF DESCRIPTION OF THE DRAWINGS

A system and method realized to fulfill the objective of the present invention is illustrated in the accompanying figures, in which.

DETAILED DESCRIPTION

Hereinafter, present invention will be described in more detail with reference to attached drawings. The following embodiments are presented only for the purpose of describing the present invention, and are not intended to limit the scope of the present invention.

Figure 2:
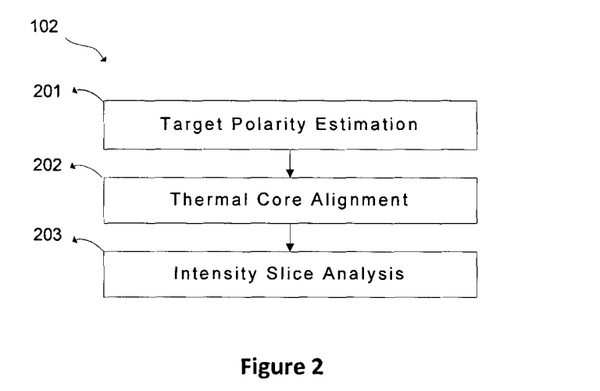
FIG. 2 shows the steps of initial window selection procedure.
Figure 6:
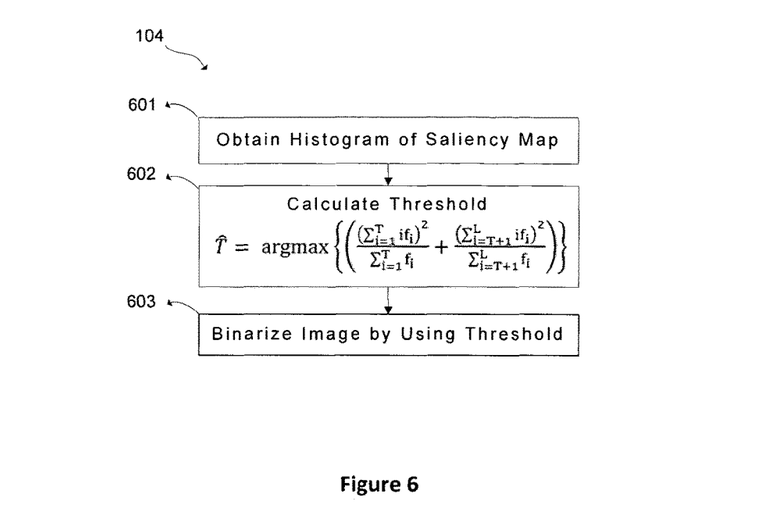
FIG. 6 shows the steps for binarization of saliency map.
Figure 7:
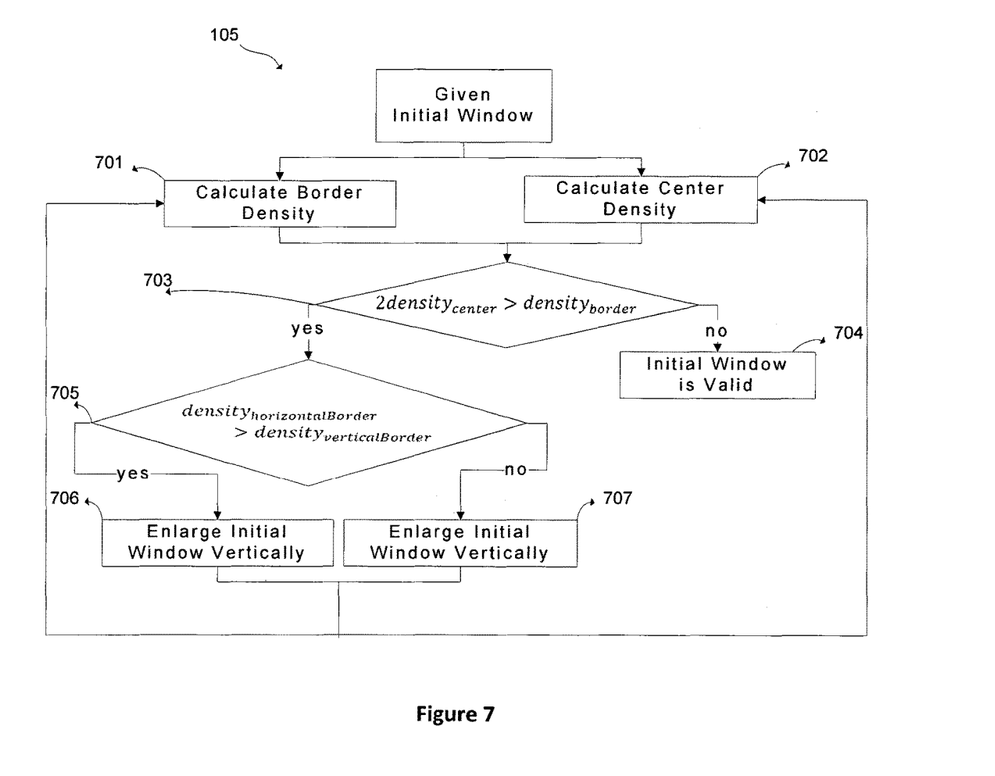
FIG. 7 shows the steps of initial window validation procedure.
Figure 8:
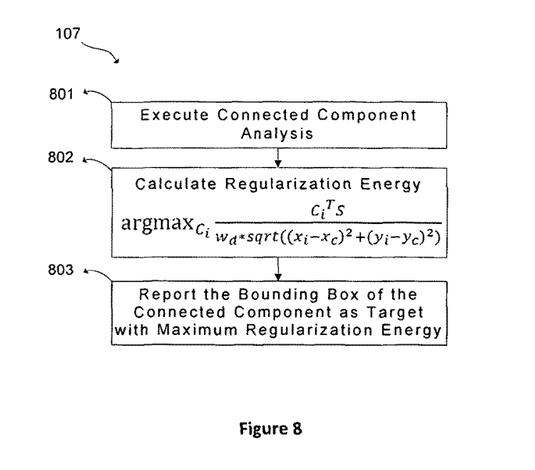
FIG. 8 shows the steps of bounding box generation for the selected target.

The track initialization method proposed in the present invention is said to be semi-automatic and appropriate for real-time applications since it requests nothing but a click input. In addition, the system can be said to be robust and user friendly since exactly same track initialization can be achieved even if the given coordinate scatters in a neighborhood and it is suitable for long-term tracking since it boosts performance of tracker by achieving better discrimination between the target and background. The details of the present invention, illustrated in FIG. 1, are explained in this part in four sections. First, utilization of the initial window selection (102) method, FIG. 2, which comprises three subsections, namely target polarity estimation (201), thermal core alignment (202) and intensity slice analysis (203) will be explained. Second, the method suggested by Wei et al., 2012 which is used for saliency map calculation (103) will be mentioned in brief. Then, utilization of the initial window validation procedure (105) together with initial window alteration step (106). FIG. 7, will be clarified by also explaining the reasoning for used heuristics on validity of saliency map; the resulting saliency map and initial window selection are closely related. Finally, binarization procedure of the saliency map (104). FIG. 6, and the target bounding box generation procedure (107). FIG. 8, is explained. The whole procedure is started by user with a click (marking) input (101) which is the single point coordinate in the vicinity of the target. These steps are extensively analyzed in this chapter.

Initial Window Selection

To calculate saliency map correctly, assumptions of saliency calculation methodology should be satisfied by providing a proper initial window. A proper window should contain entire object, which is roughly centralized, together with its immediate surroundings and is achieved in three steps: target polarity estimation, thermal core alignment, and intensity slice analysis.

Target Polarity Estimation

Figure 3:
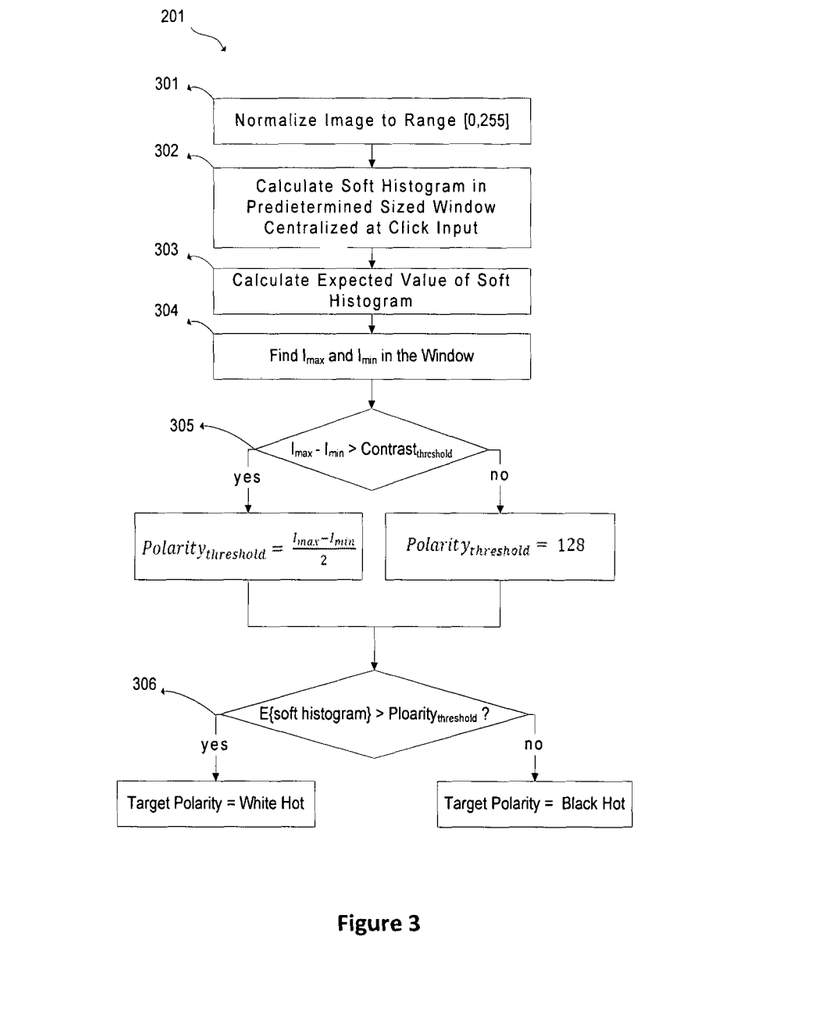
FIG. 3 shows the steps of polarity estimation procedure.

Target polarity is a strong cue for target localization and should be estimated if it is not explicitly known. For this purpose a simple thresholding method is used. First, an image patch is extracted with predetermined sized centralized at the click input and this image patch is normalized to the range [0,255] (301). Then, using the normalized image patch, soft-histogram of ROI is calculated with the weights from a 2D-Gaussian whose mean is at user input (302). Whenever target pixels dominate the soft-histogram, its expected value, which is calculated in step (303), will be shifted to the half zone of the contrast range close to target pixels. Hence, polarity is estimated by comparing expected value with polarity threshold (306) which is decided to be the average of minimum and maximum intensities in the ROI found in step or to be 128 according to contrast stretch in the ROI (304,305). Note that, variance of the Gaussian is important to ensure domination of target pixels in the ROI. If variance is too high, estimation may be dominated by background. On contrary, if it is too small, marking error tolerance will be very limited. So, we decided to select $\sqrt{2}$ times of minimum object size to correspond 68% energy of the gaussian, 1σ, which ensures the domination of target pixels with click error smaller than 0.2 times of minimum object size in the worst case. Although, it seems very limited; practically better error compensation is achieved since worst case, background composed full of minimum/ maximum intensity, is not much likely to occur. All the mentioned steps are summarized in the FIG. 3.

This phase can be considered to be optional since polarity can be a direct input. Actually in this case, the given additional information relaxes the main restriction on error compensation, and increases overall system performance.

Thermal Core Alignment

Figure 4:
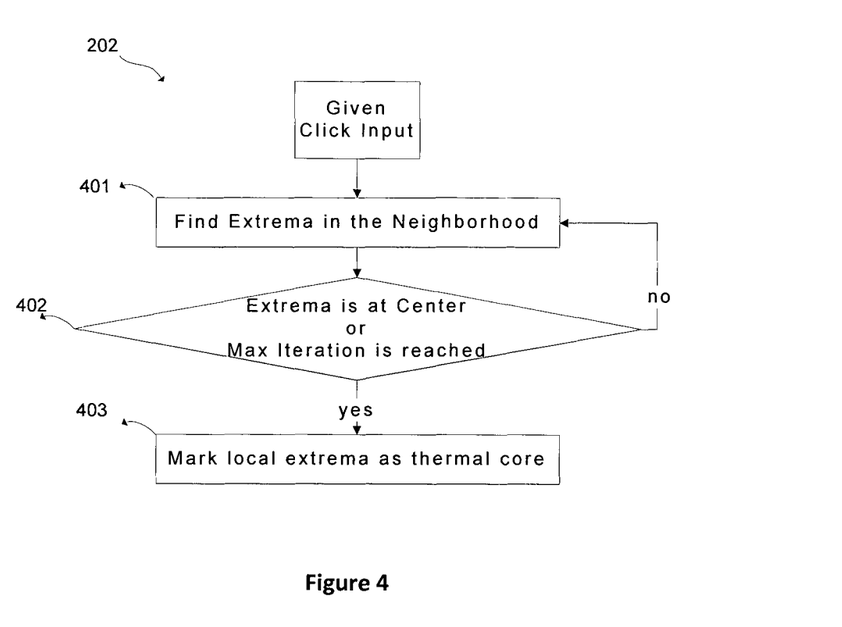
FIG. 4 shows the steps of thermal core alignment procedure.
Figure 11:
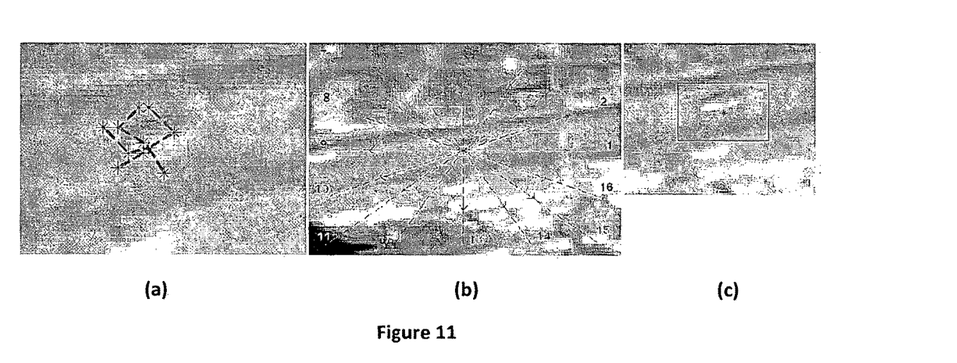
FIG. 11 shows the thermal core alignment (a), intensity slice analysis procedures (b), and resultant initial window selection (c).

According to heat distribution law; heat diffuses from hottest/coldest point, namely thermal core, to other segments smoothly. Actually, this inherently implies that thermal core must be definitely inside of the object. Thus, disclosure of thermal core yields rough centralization of object in the initial window and can be achieved by following heat (intensity) transition. However, due to noise or any imperfection monotonous transition to thermal core is not guaranteed. Hence, rather than tracing smooth transition path, jumping through local extrema iteratively becomes a possible way to locate closest thermal core. First, the local extremum is located (401) in a predetermined sized window which is centralized at the click input. Then, center of the window is shifted to new local extremum until extremum is found to be the center pixel. To be clearer, the condition to break iterations is to query if the extrema is located at the centre or to check whether maximum number of iterations is readied (402). If there are multiple extrema, having same intensity; closest is selected. After all iterations latest local extrema is selected to be the thermal core (403). Thermal core alignment is not only used for centralization of foreground but also for error compensation; since erroneous inputs scattering in the vicinity of target would possibly converge to the same thermal core as shown in (a) of FIG. 11. All the steps required by the thermal core alignment are summarized in FIG. 4.

Intensity Slice Analysis

To fulfill the assumptions of saliency calculation method, initial window should be limited in a size including whole target and its immediate surroundings, but avoiding similar objects or new layer of background. Actually, it is equivalent to search for a window size resulting in maximization of dissimilarity between target and back round however our knowledge about target and background is limited to three facts: thermal core stands inside of the target, it is a local extrema, and new background layer can start from anywhere in image space outside of the target. Since our knowledge is based on only intensity values and all directions are in need of search, intensity slices are decided to be used to measure similarity by using in Eqn. 1. Initial point of each slice is arranged to be thermal core and they extend out (501). Note that, a simple low-pass filtering is applied to intensity slices to smooth out the noise (502). In (b) of FIG. 11, middle, an example is given with 16 slices. In this case, 5 slices in resolution of 22.5° is used in each quarter to limit each of four direction of initial window; e.g. slices from 3 to 7 for top, from 7 to 11 for left and so on. Obviously, more slices yields better spatial resolution with the cost of increase in computational complexity.

$$\text{Energy}_{quarter} = \Sigma_{i=Slices\ in\ the\ quarter} \text{Slice}_i^n \quad (1)$$

Figure 5:
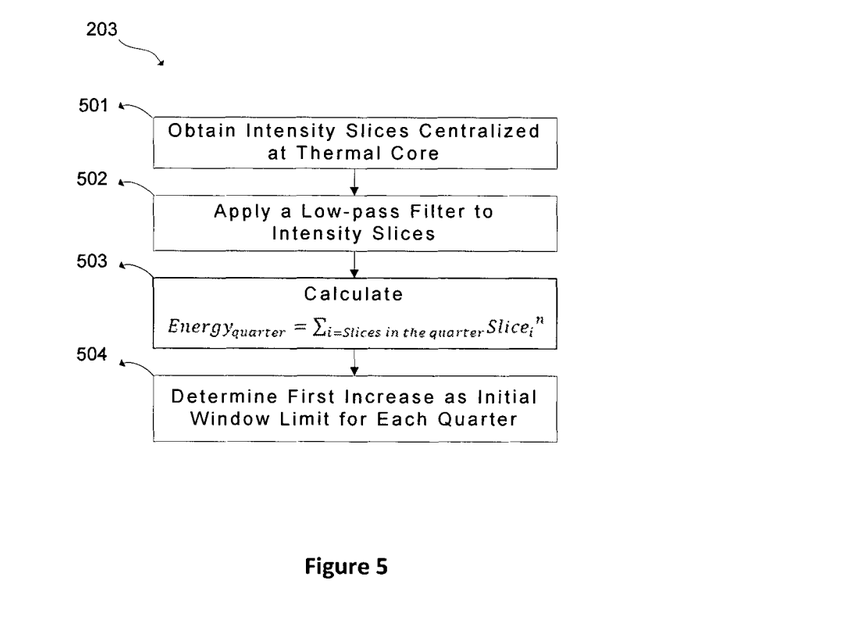
FIG. 5 shows the steps of intensity slice analysis procedure.

According to Eqn. 1 first increase of each energy quarter is achieved, (503), either at a sharp increase in one slice, possibly encountering with an object like pixel; or relatively smaller increase in multiple slices, possibly entering a new layer of background. Therefore, keeping these pixels clear of the initial window yields maximum dissimilarity so first increases are selected as limits (504). The power, n, in the energy function stands for contrast stretching as in power-law transformation and should be selected properly. If n is too high, initial window may be cropped even within the target boundary since it responds to very strict contrast difference. On the contrary, choosing n very small may cause very large initial window which is not also desired. So, window selection may fail due to improper level of contrast stretching which generally corrected in the initial window validation phase. An exemplary result of initial window selection is given in (c) of FIG. 11 which includes target (car) and its immediate surrounding (road). Note that similar object and the outer background layers are prevented to be in the initial window. The necessary steps for the intensity slice analysis are shown in FIG. 5.

Saliency Map Calculation

After selection of initial window, to extract the shape of the target saliency map of the initial window is calculated. This calculation is utilized by a recently proposed last saliency extraction method (Wei et al., 2012) in which the saliency problem is tackled from different perspective by focusing on background more than the object. Although, this method is capable of extracting a saliency map within few milliseconds; it has two basic assumptions for the input image that should be guaranteed, namely boundary and connectivity. The boundary assumption comes from a basic tendency that photographer/cameraman do not crop salient objects among the frame. Therefore, the image boundary is usually background. The second assumption, connectivity, comes from the fact that background regions are generally tend to be large and homogenous, i.e. sky, grass. In other words, most image patches can be easily connected to each other piece wisely.

Considering these two priors, the salient regions are assumed to be the patches that are extracted by downscaling or by any super pixel extraction algorithm, with high geodesic distance from the boundaries of the image which are assumed to correspond to piecewise-connected background regions. The geodesic saliency of a patch p is the accumulated edge weights along the shortest path from p to virtual background node b in an undirected weighted graph $p \in \{v, \varepsilon\}$, $$S(p) = \min_{p_1=p, p_2, \ldots, p_n=b} \Sigma_{i=1}^{n-1} \text{weight} (p_i, p_{i+1}), s.t. (p_i, p_{i+1}) \in \varepsilon, \quad (2)$$

Note that, since patches close to the center of the image requires a longer path in order to reach the background, accumulations of weights tend to be larger in the center patches. Therefore, this method also favors the center image regions as more salient which is reasonable since salient regions tend to occur around the center of image.

In the proposed method, these two assumptions are fulfilled with initial window selection method by roughly centralizing the target and including the immediate surrounding which both prevents target to be cropped among the frame and reduces target and background resemblance.

Initial Window Validation

Figure 12:
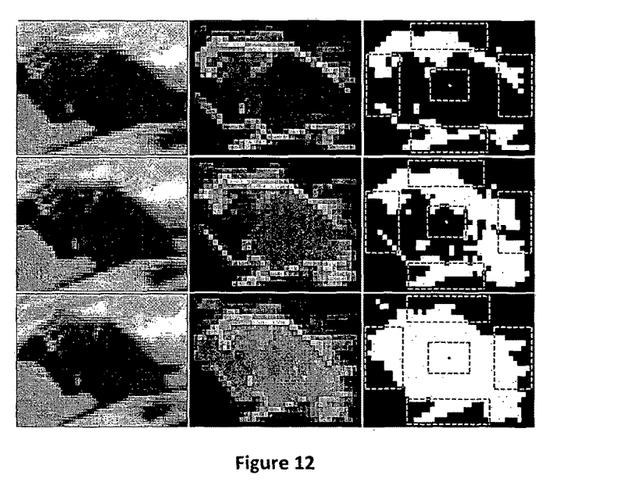
FIG. 12 shows the effect of initial window selection (left column) on saliency map (middle column), and binarization (right column).

Initial window selection guarantees rough centralization of target; however it may not always achieve successful window size due to improper level of contrast Stretching which is caused by inappropriate selection of n in Eqn. 1. Guaranteeing rough centralization yields center of binarized saliency map to be denser than its boundary. In this sense, large initial window sizes may be tolerated; however, when the object is cropped, object itself partly stands in the background which violates the boundary assumption and initial window should be corrected. In such cases, higher saliency is observed not in the middle but among border of the object. Therefore, density comparison between center and borders is used for validity check. Firstly, the binarized image is partitioned into five sections four of which is on the border and area of each is approximately twice of the center partition and then border and center densities are calculated (701,702). If the total density of borders is higher than twice of center density, (703), the initial window size is enlarged until the condition is dissatisfied which means a valid initial window (704). Note that, it is not enlarged in both directions simultaneously; but only in direction where boundary partitions are sparser, (705,706,707). In FIG. 12, effect of initial window (left) selection on saliency map (middle) and binarization (right) is visualized. Note that first initial window selection (first row) is altered and the after initial window alterations target shown in the last row of FIG. 12 is selected. In this particular case, horizontal enlargement is achieved since resultant saliency acknowledges that target is cropped horizontally.

Binarization of Saliency Map & Target Bounding Box Generation

Although minimum computational cost is desired in each step, using static threshold or suboptimal methods for binarization may be problematic. Thus, Otsu's method is used with slight refinement. The method of Otsu, can be either defined as an exhaustive search for the threshold that either minimizes the within-class variance or maximizes between-class variance. The between-class variance is often calculated as given in Eqn. 3:

$$\sigma_B^2 = w_b w_f (\mu_b - \mu_f)^2 \quad (3)$$

where $w_b$, $w_f$ is referred as class probabilities and $\mu_b, \mu_f$ are class means. After some manipulations. Eqn. 3 can be written as in Eqn. 4.

$$\sigma_B^2 = w_b \mu_b^2 + w_f \mu_f^2 - \mu^2 \quad (4)$$

Where $\mu$ is the mean value of the histogram. Since the purpose is to calculate the optimal threshold value T that maximizes $\sigma_B^2$, the problem can be solved by either inserting Eqn. 3 or Eqn. 4 into the Eqn. 5.

$$\hat{T} = \mathrm{argmax}\{\sigma_B^2\} \quad (5)$$

Note that using Eqn. 3 and Eqn. 4 directly results in Eqn. 6 and Eqn. 7 respectively;

$$\hat{T} = \mathrm{argmax}\left\{\left(\sum_{i=1}^{T} f_i\right)\left(\sum_{i=T+1}^{L} f_i\right)\left(\frac{\sum_{i=2}^{T} if_i}{\sum_{i=1}^{T} f_i} - \frac{\sum_{i=T+1}^{L} if_i}{\sum_{i=T+1}^{L} f_i}\right)^2\right\} \quad (6)$$

$$\hat{T} = \mathrm{argmax}\left\{\left(\frac{\left(\sum_{i=1}^{T} if_i\right)^2}{\sum_{i=1}^{T} f_i} + \frac{\left(\sum_{i=T+1}^{L} if_i\right)^2}{\sum_{i=T+1}^{L} f_i}\right)\right\} \quad (7)$$

where the number of pixels with gray level i 1≤i≤L is given with $f_i$.(601) As it can be seen using Eqn. 4 becomes slightly advantageous since constant $\mu$ term is dropped out. This slight modification results in one less multiplication in Eqn. 7 than Eqn. 6 which results in L less multiplication in exhaustive search used in Otsu's methodology. Therefore, in order to achieve binarization threshold Eqn. 7 is preferred (602) and then the saliency map is binarized by using the obtained threshold (603). The binarization procedure is summarized in FIG. 6.

After thresholding the saliency map, first a connected component analysis is executed (801). Then, the connected component maximizing the regularization energy given by Eqn. 8, i.e. the most salient region with minimum distance to the center, is selected as the target (802).

$$\mathrm{argmax}_{C_i} \frac{C_i^T S}{w_d * sqrt((x_i - x_c)^2 + (y_i - y_c)^2)} \quad (8)$$

where Ci is the vectorized form obtained by raster scanning the 2D label matrix with values 1 and 0 as foreground and background respectively, S is the saliency map vectorized similarly, $w_d$ determines the weight of distance in calculation, and (xi,yi), (xc,yc) are the centers of each connected component and the initial window respectively. Finally, bounding box of the selected target is reported (803). Target selection procedure is summarized in FIG. 8.

The invention claimed is:

1. A real-time, semi-automatic track initialization method applied to a tracker for boosting performance of the tracker by initializing the tracker with more discriminative targets, the real-time, semi-automatic, method comprising the following steps:
   given click input;
   selecting initial window that includes target and its immediate surroundings;
   calculating saliency map in the given initial window;
   binarizing the saliency map;
   validating initial window, and altering if necessary;
   generating minimum sized bounding box enclosing the target, which is used for track initialization as output
   wherein the initial window validation further comprises:
   calculating border density,
   calculating center density,
   validating initial window, if the result of querying the border density less than twice of the center density,
   deciding on the enlargement direction by finding sparser direction in the result of comparison of horizontal and vertical border densities.

2. A real-time, semi-automatic track initialization method applied to a tracker for boosting performance of the tracker by initializing the tracker with more discriminative targets, the real-time, semi-automatic track initialization method, comprising the following steps:
   given click input;
   selecting initial window that includes target and its immediate surroundings;
   calculating saliency map in the given initial window;
   binarizing the saliency map;
   validating initial window, and altering if necessary;
   generating minimum sized bounding box enclosing the target, which is used for track initialization as output,
   wherein initial window selection step further comprises the sub-steps of:
   target polarity estimation,
   thermal core alignment,
   intensity slice analysis;
   wherein the initial window validation further comprises:
   calculating border density,
   calculating center density,
   validating initial window, if the result of querying the border density less than twice of the center density,
   deciding on the enlargement direction by finding sparser direction in the result of comparison of horizontal and vertical border densities.

3. The real-time, semi-automatic track initialization method according to claim 1, wherein the binarization of saliency map step further comprises the sub-steps of:
  obtaining histogram of the calculated saliency map,
  calculating the threshold for binarization,
  binarizing image with the calculated threshold.

4. The real-time, semi-automatic track initialization method according to claim 1, wherein the target bounding box generation step further comprises the sub-steps of:
  executing connected component analysis,
  calculating regularization energy of each connected component,
  reporting the bounding box of the connected component as target with maximum regularization energy.

5. The real-time, semi-automatic track initialization method according to claim 2, wherein the target polarity estimation step further comprises the sub-steps of:
  normalizing image into the range [0-255],
  calculating soft histogram in predetermined sized window, roi, that is centralized at the click input,
  calculating the expected value of the soft histogram,
  finding maximum and minimum value of pixels in the roi,
  determining polarity threshold according to contrast range,
  determining target polarity by comparing expected value of the soft histogram with the polarity threshold.

6. The real-time, semi-automatic track initialization method according to claim 2, wherein the thermal core alignment step further comprises the sub-steps of:
  given click input,
  finding the pixel having maximum/minimum intensity level iteratively according to target polarity,
  checking for the condition to break iterations, if the extrema is located at center or maximum number of iterations are reached,
  marking local extrema when the all iterations are finalized.

7. The real-time, semi-automatic track initialization method according to claim 2, wherein the intensity slice analysis step further comprises the sub-steps of:
  obtaining intensity slices which includes pixel values starting from thermal core and reaches out radially,
  applying a simple low-pass filter to intensity slices to smooth out the noise,
  calculating energies for each quarter,
  selecting the distances corresponding first increases in energies calculated in as initial window limits for each quarter.

8. The real-time, semi-automatic track initialization method according to claim 7, wherein the step intensity slice analysis uses the energy function given below to maximize dissimilarity between target and background.

$$\text{Energy}_{quarter} = \sum_{i=\text{Slices in the quarter}} \text{Slice}_i^n.$$

9. The real-time, semi-automatic track initialization method of claim 1, wherein the step binarization of saliency map uses the modified version of the equation $\sigma_B^2 = w_b w_f (\mu_b - \mu_f)^2$ which is used in Otsu's, as $\sigma_B^2 = w_b \mu_b^2 + w_f \mu_f^2 - \mu^2$, and results in L, number of histogram bins, less multiplication and formulated as:

$$\hat{T} = \underset{T}{\operatorname{argmax}} \left\{ \left( \frac{\left(\sum_{i=1}^{T} if_i\right)^2}{\sum_{i=1}^{T} f_i} + \frac{\left(\sum_{i=T+1}^{L} if_i\right)^2}{\sum_{i=T+1}^{L} f_i} \right) \right\}.$$

10. The real-time, semi-automatic track initialization method according to claim 1, wherein the step target bounding box generation selects most possible target by using the energy function given below and returns the bounding box of the connected component maximizing the regularization energy in order to report selected target.

$$\underset{C_i}{\operatorname{argmax}} \frac{C_i^T S}{w_d * sqrt((x_i - x_c)^2 + (y_i - y_c)^2)}.$$

11. The real-time, semi-automatic track initialization method according to claim 1, wherein becoming both semi-automatic and appropriate for real-time applications by requesting nothing but a click input from user which is the given input in step click input.

12. The real-time, semi-automatic track initialization method according to claim 1, wherein robust and user friendly since exactly same track initialization is achieved even if the given coordinate scatters in a neighborhood.

13. The real-time, semi-automatic track initialization method according to claim 1, wherein suitable for long-term tracking since it boosts performance of tracker by achieving better discrimination between the target and background.

14. The real-time, semi-automatic track initialization method according to claim 1, wherein the step initial window selection obtains proper window containing entire object, which is roughly centralized, together with its immediate surroundings to fulfill the assumptions that are made in saliency map calculation methodology.

* * * * *